US011335066B2

(12) United States Patent
Ha et al.

(10) Patent No.: US 11,335,066 B2
(45) Date of Patent: May 17, 2022

(54) APPARATUS AND OPERATING METHOD FOR DISPLAYING AUGMENTED REALITY OBJECT

(71) Applicant: Samsung Electronics Co., Ltd., Suwon-si (KR)

(72) Inventors: Inwoo Ha, Seongnam-si (KR); Sunghoon Hong, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/879,859

(22) Filed: May 21, 2020

(65) Prior Publication Data
US 2021/0110613 A1    Apr. 15, 2021

(30) Foreign Application Priority Data
Oct. 15, 2019   (KR) .................. 10-2019-0127750

(51) Int. Cl.
| | |
|---|---|
| *G06T 19/00* | (2011.01) |
| *G06T 5/00* | (2006.01) |
| *G06T 7/50* | (2017.01) |
| *G06T 15/00* | (2011.01) |
| *G06T 3/40* | (2006.01) |
| *G06F 3/01* | (2006.01) |

(52) U.S. Cl.
CPC .......... *G06T 19/006* (2013.01); *G06F 3/013* (2013.01); *G06T 3/40* (2013.01); *G06T 5/002* (2013.01); *G06T 7/50* (2017.01); *G06T 15/00* (2013.01); *G06T 2200/24* (2013.01)

(58) Field of Classification Search
CPC ........... G06T 19/006; G06T 7/50; G06T 3/40; G06T 15/00; G06F 3/013
See application file for complete search history.

(56) References Cited

U.S. PATENT DOCUMENTS

| | | | | |
|---|---|---|---|---|
| 5,491,486 A | * | 2/1996 | Welles, II ................. | G01S 1/04 342/357.74 |
| 9,675,878 B2 | | 6/2017 | Barney et al. | |
| 2008/0150965 A1 | * | 6/2008 | Bischoff .................... | G06T 7/70 345/632 |
| 2011/0123068 A1 | * | 5/2011 | Miksa ....................... | G06T 5/20 382/105 |
| 2012/0206452 A1 | * | 8/2012 | Geisner .................... | H04S 7/304 345/419 |

(Continued)

FOREIGN PATENT DOCUMENTS

| | | |
|---|---|---|
| CN | 106597673 A | 4/2017 |
| CN | 109600668 A | 4/2019 |

(Continued)

*Primary Examiner* — Sarah Lhymn
(74) *Attorney, Agent, or Firm* — NSIP Law

(57) ABSTRACT

A display apparatus and an operating method thereof obtain at least one first sensor data of a first point in time, receive a first image frame including a first augmented reality (AR) object corresponding to the first point in time, the first AR object generated by a first processor, based on the first sensor data, obtain second sensor data of a second point in time subsequent to the first point in time, correct the first AR object to a second AR object matched to the second point in time, based on the second sensor data, and display a second image frame including the second AR object.

25 Claims, 7 Drawing Sheets

(56) References Cited

U.S. PATENT DOCUMENTS

| | | | | |
|---|---|---|---|---|
| 2015/0369864 A1* | 12/2015 | Marlow | ............... | G06F 3/011 |
| | | | | 702/191 |
| 2016/0125565 A1* | 5/2016 | Sulatycke | ............ | G09G 5/363 |
| | | | | 345/522 |
| 2018/0188534 A1* | 7/2018 | Stafford | ............. | A63F 13/212 |

FOREIGN PATENT DOCUMENTS

| JP | 6408629 B2 | 10/2018 |
|---|---|---|
| KR | 10-2018-0041984 A | 4/2018 |
| KR | 10-2018-0137816 A | 12/2018 |
| KR | 10-2019-0035116 A | 4/2019 |

\* cited by examiner

APPARATUS AND OPERATING METHOD FOR DISPLAYING AUGMENTED REALITY OBJECT

CROSS-REFERENCE TO RELATED APPLICATIONS

This application claims the benefit under 35 USC § 119(a) of Korean Patent Application No. 10-2019-0127750 filed on Oct. 15, 2019 in the Korean Intellectual Property Office, the entire disclosure of which is incorporated herein by reference for all purposes.

BACKGROUND

1. Field

The following description relates to an apparatus for displaying an augmented reality (AR) object and an operating method thereof.

2. Description of Related Art

Virtual reality (VR) allows a user to view a virtual object which is not present in reality through a display and/or a virtual rendering device. The virtual rendering device projects a VR object to a two-dimensional or three-dimensional virtual environment already produced, whereby the user may be immersed in a virtual space different from the reality. Unlike VR, augmented reality (AR) is provided in the form of adding a virtual object to the real environment that the user is viewing currently. Since AR combines the virtual object with the real environment that the user views, the user viewing an AR image may experience dizziness, motion sickness, headache due to image mismatching if the virtual object and the real environment are not matched appropriately.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an operating method of a display apparatus includes obtaining first sensor data of a first point in time, receiving a first image frame including a first augmented reality (AR) object corresponding to the first point in time, the first AR object generated by a first processor, based on the first sensor data, obtaining second sensor data of a second point in time subsequent to the first point in time, correcting the first AR object to a second AR object matched to the second point in time, based on the second sensor data, and displaying a second image frame including the second AR object.

The correcting may include correcting the first AR object to the second AR object by performing one or both of two-dimensional (2D) image processing based on at least one of red, green, blue (RGB) information and depth information of the first AR object and three-dimensional (3D) image processing with respect to the first AR object, based on the second sensor data.

The correcting may include correcting the first AR object to the second AR object by performing an operation for image processing, based on a difference between the first sensor data and the second sensor data.

The operation for image processing may be changed based on one or both of a type of at least one sensor used to sense the first sensor data and the second sensor data, and an application field in which the second AR object is used.

The correcting may include correcting the first AR object to the second AR object by shifting the first AR object through a shift operation, based on a difference between the first sensor data and the second sensor data.

The correcting may include partially rendering the first AR object corresponding to a partial area in the first image frame, and matching the partially rendered first AR object to the second image frame corresponding to the second point in time.

The second sensor data may include second motion information corresponding to the second point in time, the second motion information obtained by an inertial measurement unit (IMU) sensor, and wherein the correcting may include correcting the first AR object to the second AR object by controlling one or both of an operating frequency of a sensor used to sense the first sensor data and a resolution of the first AR object, based on the second motion information.

The second motion information may include any one or any combination of a motion of a user corresponding to the second point in time, a motion of a target object included in the second sensor data, and a motion of the display apparatus corresponding to the second point in time.

The correcting may include one or both of correcting the first AR object to the second AR object by increasing the operating frequency of the sensor used to sense the first sensor data and decreasing the resolution of the first AR object, in response to the second motion information being greater than first motion information corresponding to the first point in time, and correcting the first AR object to the second AR object by decreasing the operating frequency of the sensor used to sense the first sensor data and increasing the resolution of the first AR object, in response to the second motion information being less than or equal to the first motion information.

The second sensor data may include gaze information corresponding to the second point in time, the gaze information obtained by a gaze sensor used to sense a gaze of a user who uses the display apparatus, and the correcting may include controlling a resolution of the first AR object, based on the gaze information corresponding to the second point in time.

The controlling may include one or both of increasing the resolution of the first AR object by performing up-sampling with respect to the first AR object included in a focusing area based on the gaze information corresponding to the second point in time, and decreasing the resolution of the first AR object by performing a blur operation with respect to the first AR object included in a defocusing area based on the gaze information.

The second sensor data may include a second depth value of a background area corresponding to the second point in time, the second depth value sensed by a depth sensor, and the correcting may include determining an arrangement of the first AR object and the background area, based on a first depth value of the first AR object and the second depth value, and performing occlusion processing with respect to at least a partial area of the first AR object, based on the arrangement.

The operating method may further include updating a synchronization signal for synchronization between the first processor and a display of the display apparatus, irrespective of whether the first processor and the display are synchronized.

The first processor may be included in any one or any combination of the display apparatus, an external device different from the display apparatus, and a cloud server, and the first processor may be configured to generate the first AR object through 3D rendering.

The display apparatus may include any one or any combination of a head-up display (HUD), a user terminal, an AR device, a wearable device, and smart glasses including a display.

One or both of the first sensor data and the second sensor data may be sensed by any one or any combination of a camera sensor, an IMU sensor, a gaze sensor, an eye tracker, and a depth sensor included in the display apparatus.

In another general aspect, a display apparatus includes at least one sensor configured to obtain first sensor data of a first point in time and second sensor data of a second point in time subsequent to the first point in time, a communication interface configured to receive a first image frame including a first AR object corresponding to the first point in time, the first AR object generated by a first processor based on the first sensor data, a second processor configured to correct the first AR object to a second AR object matched to the second point in time, based on the second sensor data, and a display configured to display a second image frame including the second AR object.

The second processor may be configured to correct the first AR object to the second AR object by performing one or both of 2D image processing based on at least one of RGB information and depth information of the first AR object and 3D image processing with respect to the first AR object, based on the second sensor data.

The second processor may be configured to correct the first AR object to the second AR object by performing an operation for the image processing, based on a difference between the first sensor data and the second sensor data.

In another general aspect, a display apparatus includes a sensor configured to sense first sensor data of a first point in time and second sensor data of a second point in time subsequent to the first point in time; an interface configured to receive a first augmented reality (AR) object that is generated based on the first sensor data and corresponds to the first point in time; a processor configured to perform image processing on the first AR object based on the second sensor data to generate a second AR object matched to the second point in time; and a display configured to display the second AR object.

The first AR object may be included in a first image frame that is transmitted to the display apparatus with a latency.

The first AR object may be generated by a second processor.

The second processor may be included in the display apparatus or may be independent from the first apparatus.

Other features and aspects will be apparent from the following detailed description, the drawings, and the claims.

Figure 1:
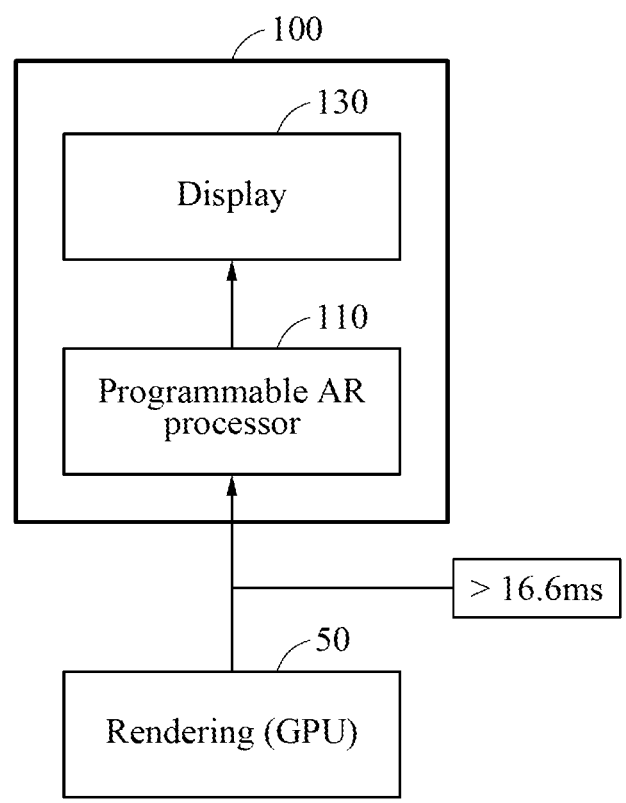
FIG. 1 illustrates an example of an operation of an apparatus for displaying an augmented reality (AR) object.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

Hereinafter, examples will be described in detail with reference to the accompanying drawings. The scope of the right, however, should not be construed as limited to the example embodiments set forth herein. Like reference numerals in the drawings refer to like elements throughout the present disclosure.

Various modifications may be made to the examples. Here, the examples are not construed as limited to the disclosure and should be understood to include all changes, equivalents, and replacements within the idea and the technical scope of the disclosure.

The terminology used herein is for the purpose of describing particular examples only and is not to be limiting of the examples. As used herein, the singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined, all terms including technical and scientific terms used herein have the same meaning as commonly understood by one of ordinary skill in the art to which examples belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

FIG. 1 illustrates an example of an operation of an apparatus for displaying an augmented reality (AR) object. Referring to FIG. 1, an apparatus 100 for displaying an AR object, hereinafter, the "display apparatus" 100, includes a processor 110 and a display 130.

A graphics processing unit 50 generates a two-dimensional (2D) image including a three-dimensionally rendered AR object. The GPU 50 has high latency due to high computational complexity. The GPU 50 is also referred to as the "first processor".

The display apparatus 100 receives an image frame including the three-dimensionally rendered AR object from the GPU 50. For example, the image frame is transmitted to the processor 110 of the display apparatus 100 using wired communication through a High Definition Multimedia Interface (HDMI) cable between the processor 110 of the display apparatus 100 and the GPU 50, or wireless communication such as wireless-fidelity (Wi-Fi). The processor 110 is also referred to as the "second processor".

In this example, the image frame transmitted from the GPU 50 to the processor 110 has a latency greater than, for example, 16.6 milliseconds (ms). Thus, there occurs a significant time difference between a first point in time (t-1) at which the image frame is generated by the GPU 50 and a second point in time (t) at which the image frame transmitted from the GPU 50 to the processor 110 is received by the processor 110 and played back by the display 130. In this example, the three-dimensional (3D) AR object rendered based on data of the first point in time is not matched to a background environment of the second point in time.

The processor 110 corrects the AR object such that the AR object rendered based on the data of the first point in time is matched to be suitable for the data of the second point in time through a simple arithmetic operation with respect to the 2D image frame received from the GPU 50. The processor 110 corrects the AR object through the simple arithmetic operation with respect to the 2D AR object, and the simple arithmetic operation includes, for example, a shift operation, partial rendering, an up-sampling operation, a down-sampling operation, a blur operation, and partial rendering.

The processor 110 is a processing unit that considers the environmental characteristics of AR and may be a 2D image processor with lower computation power than the GPU 50. The processor 110 is, for example, a programmable AR processor unit (ARPU).

For example, the processor 110 receives an AR object stored in a frame buffer of the GPU 50 and outputs, to the display 130, an AR object processed and finally corrected based on a variety of sensor data. The processor 110 is disposed at a position at which the latency is minimized, that is, a position adjacent to the display 130 if the data or image is transmitted to the display 130 in the display apparatus 100.

The display apparatus 100 is, for example, a head-up display (HUD), a user terminal such as a smart phone, an AR device, a wearable device, or smart glasses including the display 130. The wearable device is, for example, a head-mounted wearable device or a watch-type wearable device.

Figure 2:
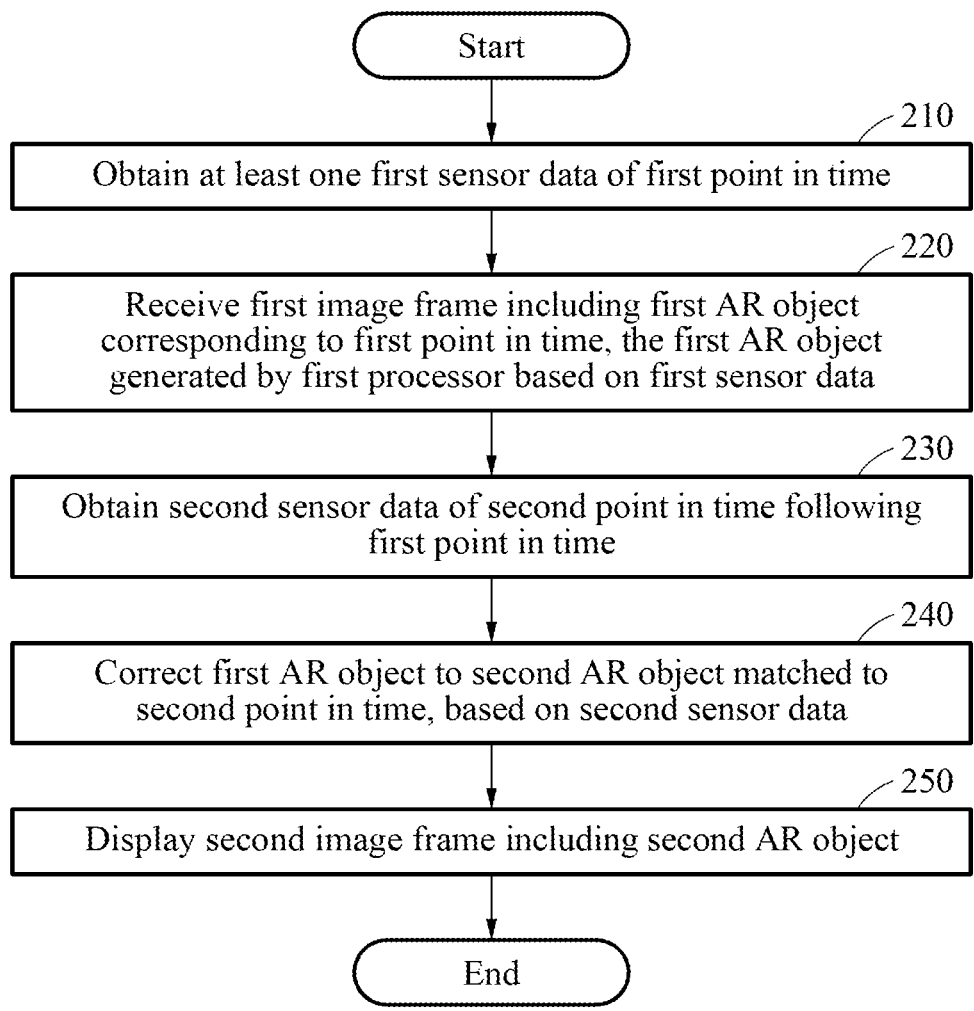
FIG. 2 illustrates an example of an operating method of an apparatus for displaying an AR object.

FIG. 2 illustrates an example of an operating method of an apparatus for displaying an AR object. Referring to FIG. 2, an operation of a display apparatus including a second processor is illustrated. In operation 210, the display apparatus obtains at least one first sensor data of a first point in time.

In operation 220, the display apparatus receives a first image frame including a first AR object corresponding to the first point in time, the first AR object generated by a first processor based on the first sensor data. In this example, the first processor is included in the display apparatus or is included in an external device or a cloud server different from the display apparatus. The first processor is, for example, a GPU configured to perform a complex operation such as 3D rendering of AR objects. The first processor generates the first AR object corresponding to the first point in time through 3D rendering based on the at least one first sensor data of the first point in time.

In operation 230, the display apparatus obtains second sensor data of a second point in time following (subsequent to) the first point in time. The first sensor data and/or the second sensor data is sensed by any one or any combination of, for example, a red, green, blue (RGB) camera sensor, an inertial measurement unit (IMU) sensor, a gaze sensor, an eye tracker, and a depth sensor included in the display apparatus. In this example, the first sensor data of the first point in time and the second sensor data of the second point in time are data sensed by the same type of sensor.

In operation 240, the display apparatus corrects the first AR object to a second AR object matched to the second point in time, based on the second sensor data. The second processor included in the display apparatus corrects the first AR object generated by the first processor to the second AR object matched to the second point in time, based on the second sensor data. The display apparatus corrects the first AR object to the second AR object by performing at least one of 2D image processing based on at least one of RGB information and depth information of the first AR object and 3D image processing with respect to the first AR object, based on the second sensor data.

The display apparatus corrects the first AR object to the second AR object by performing an operation for image processing, for example, based on a difference between the first sensor data and the second sensor data. The operation for image processing corresponds to a simple arithmetic operation with respect to a 2D AR object. The operation for image processing includes, for example, a shift operation, partial rendering, a positioning operation, an up-sampling operation, a down-sampling operation, a blur operation, and a depth operation. However, examples are not limited thereto. The positioning operation is an operation for calculating a position of an AR object, that is, a localization operation.

For example, if a cloud is used, an actual rendering operation is processed by the cloud, and the display apparatus simply corrects a result calculated by the cloud.

The operation for image processing is changed based on at least one of a type of a sensor used to sense the first sensor data or the second sensor data, and an application field in which the second AR object is used. The type of the sensor includes, for example, an RGB camera sensor, an IMU sensor, a gaze sensor, an eye tracker, and a depth sensor. However, examples are not limited thereto.

An example of correcting the first AR object to the second AR object by the display apparatus through the operation for image processing will be described further with reference to FIGS. 4 to 7. Further, the display apparatus corrects the first AR object included in the first image frame to an image-level second AR object based on a position of a target object and/or a position of a camera that changes after a rendering start point in time of the first processor.

In operation 250, the display apparatus displays a second image frame including the second AR object. The display apparatus displays the second image frame through a display included in the display apparatus, for example, a display 870 of FIG. 8.

Figure 3:
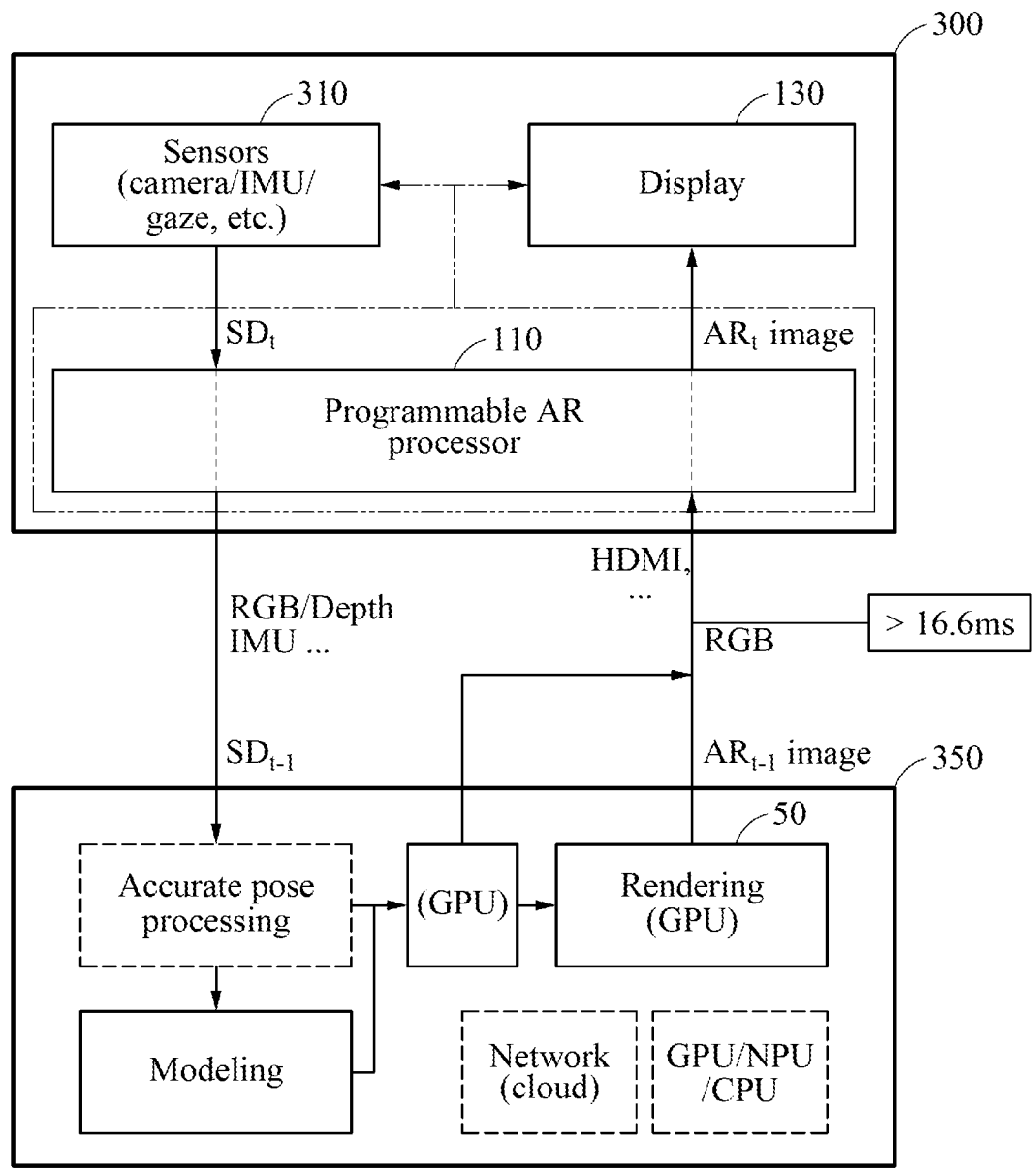
FIG. 3 illustrates an example of an operation of an apparatus for displaying an AR object.

FIG. 3 illustrates an example of an operation of an apparatus for displaying an AR object. Referring to FIG. 3, a display apparatus 300 includes sensors 310, the display 130, and the second processor 110.

The sensors 310 include, for example, an RGB camera sensor, an IMU sensor, a gaze sensor, an eye tracker, and a depth sensor.

The display apparatus 300 transmits at least one sensor data ($SD_{t-1}$) of a point in time t-1 obtained through the sensors 310 to the second processor 110 and a device 350. The device 350 calculates an accurate pose based on the at least one sensor data ($SD_{t-1}$) of the point in time t-1 received from the display apparatus 300. The device 350 models a 3D AR object corresponding to the point in time t-1 based on a pose calculation result. The device 350 generates an image frame ($AR_{t-1}$) corresponding to the point in time t-1 by rendering the 3D AR object through the first processor 50. The image frame ($AR_{t-1}$) is a 2D image including a first AR object corresponding to the point in time t-1.

The device 350 transmits the image frame ($AR_{t-1}$) to the display apparatus 300. The image frame ($AR_{t-1}$) is transmitted to the display apparatus 300, for example, with a latency of at least 16.6 ms.

For example, if the image frame ($AR_{t-1}$) is transmitted to the device 350 at a point in time t, the display apparatus 300 obtains at least one sensor data ($SD_t$) of the point in time t using the sensors 310. The second processor 110 of the display apparatus 300 corrects a first AR object corresponding to the point in time t-1 included in the image frame ($AR_{t-1}$) to a second AR object matched to the point in time t, based on the at least one sensor data ($SD_t$) of the point in time t.

The display apparatus 300 displays an image frame ($AR_t$) corresponding to the point in time t and including the second AR object through the display 130. The second processor 110 corrects the image frame ($AR_{t-1}$) corresponding to the point in time t-1 to the image frame ($AR_t$) corresponding to the point in time t by performing an operation for 2D image processing, based on a difference between the at least one sensor data ($SD_{t-1}$) of the point in time t-1 and the at least one sensor data ($SD_t$) of the point in time t. In this example, the operation for 2D image processing is changed based on at least one of types of the sensors 310 used to sense the sensor data, and an application field in which the second AR object is used.

The device 350 is a device included in the display apparatus 300, or an external device that communicates with the display apparatus 300 through a network such as a cloud server. The first processor 50 is a device capable of 3D rendering, such as, for example, a GPU, a neural network processing unit (NPU), or a central processing unit (CPU).

The display apparatus 300 performs a simple operation with respect to an image frame corresponding to a point in time t-1, the image frame generated through complex processing by the device 350, thereby providing a user with an image frame matched to a point in time t while minimizing latency.

Figure 4A:
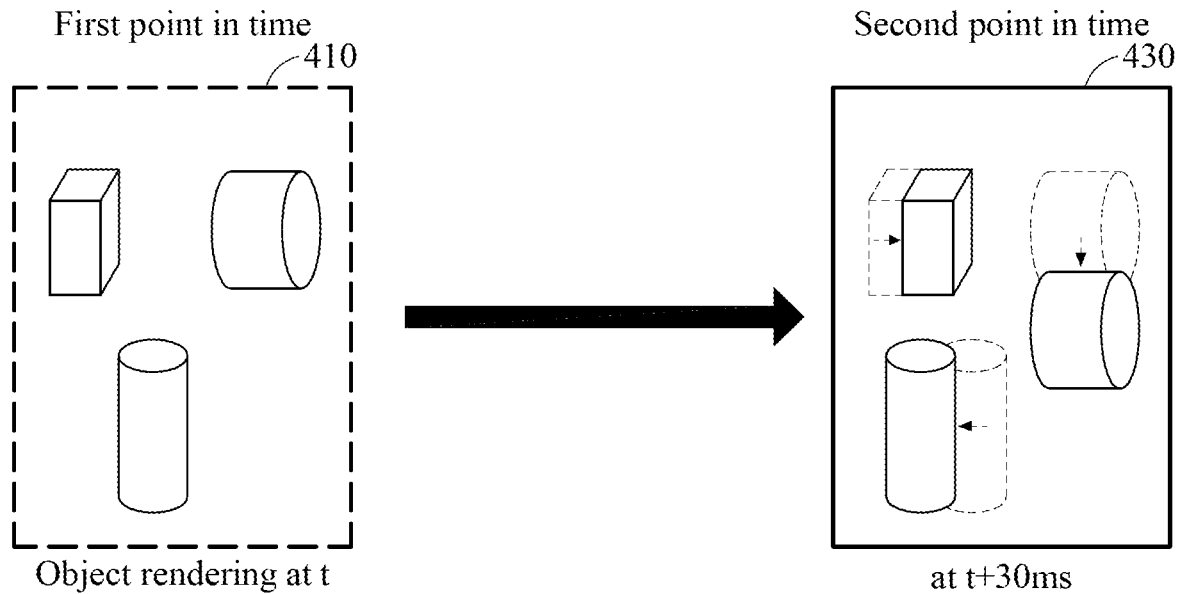
FIGS. 4A and 4B illustrate examples of correcting an AR object by a second processor.
Figure 4B:
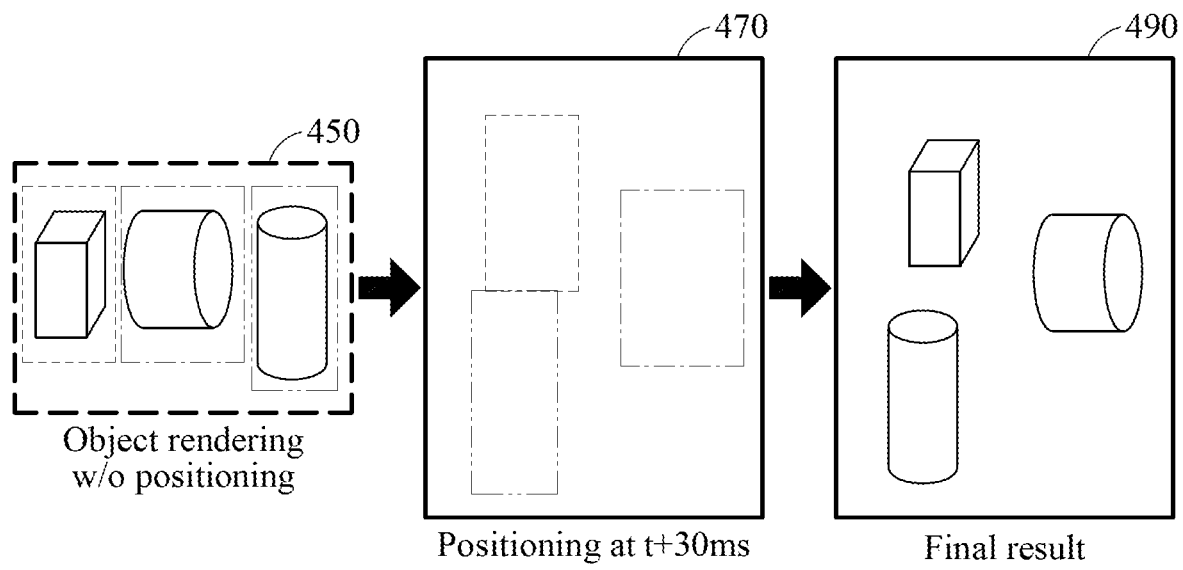

FIGS. 4A and 4B illustrate examples of correcting an AR object by a second processor. Referring to FIG. 4A, an image frame 410 including AR objects corresponding to a first point in time (t) and an image frame 430 including shifted AR objects corresponding to a second point in time (t+30 ms), are illustrated. The image frame 410 is rendered by a first processor, for example, a GPU. In FIGS. 4A and 4B, broken lines correspond to operations performed by the first processor, and solid lines correspond to operations performed by a second processor, for example, an ARPU.

A display apparatus corrects a first AR object corresponding to the first point in time (t) to a second AR object corresponding to the second point in time (t+30 ms) by shifting the first AR object included in the image frame 410 through a shift operation, based on a difference between sensor data of the first point in time (t) and sensor data of the second point in time (t+30 ms). For example, if the sensor data is image data captured by an RGB camera, the display apparatus corrects the first AR object to the second AR object corresponding to the second point in time (t+30 ms) by shifting the first AR object upward, downward, leftward, or rightward by a distance corresponding to a difference in distances or coordinates between objects included in the image of the first point in time (t) and the image of the second point in time (t+30 ms). Through this correction, the display apparatus prevents a user from experiencing dizziness due to matching errors of AR objects.

Referring to FIG. 4B, a result image 450 acquired by rendering AR objects by the first processor corresponding to the first point in time (t) without positioning, an image 470 showing a positioning result of the second point in time (t+30 ms) calculated by the second processor, and an image 490 acquired by disposing the AR images included in the image 450 based on the positioning result of the image 470, are illustrated.

The display apparatus corrects a first AR object corresponding to the first point in time (t) to a second AR object corresponding to the second point in time (t+30 ms) by disposing an AR object rendered by the first processor without a positioning operation based on the positioning result of the second point in time (t+30 ms).

Figure 5:
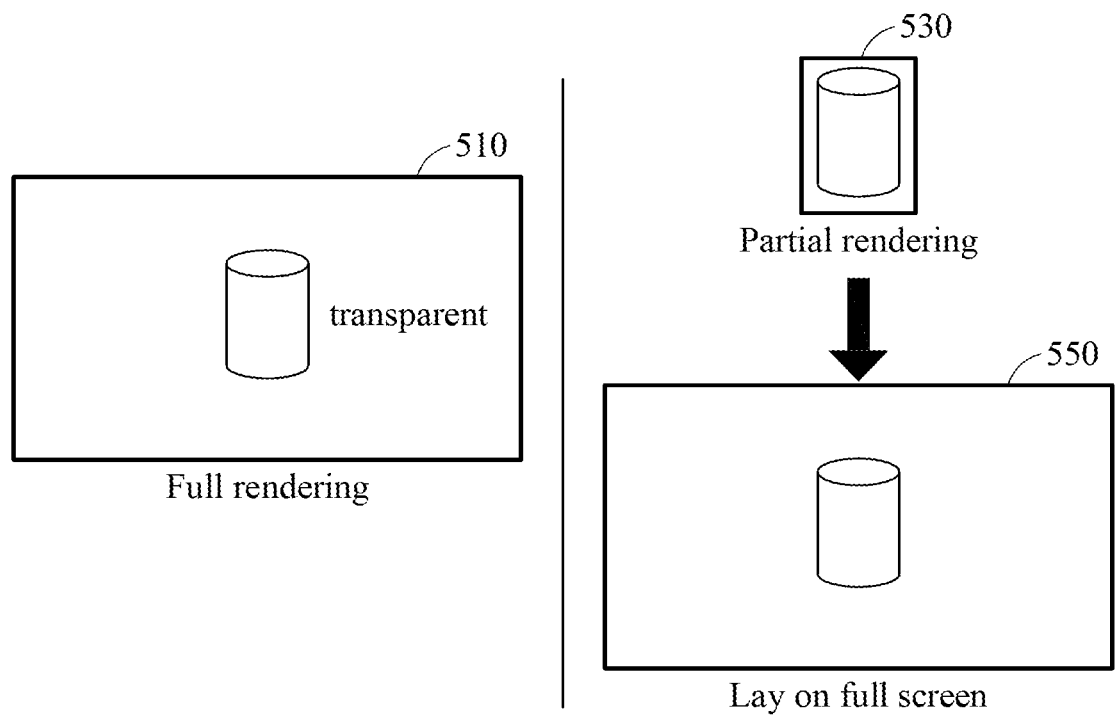
FIG. 5 illustrates an example of correcting an AR object by partial rendering.

FIG. 5 illustrates an example of correcting an AR object by partial rendering. Referring to FIG. 5, a first image frame 510 including an AR object corresponding to a first point in time, the AR object fully rendered by a first processor, and a second image frame 550 obtained by displaying an AR object 530 partially rendered by a second processor on a full screen, are illustrated. The first processor generates a final rendering result and thus, is incapable of performing partial rendering.

For example, it is assumed that a region excluding the AR object displayed in the form of a cylinder in the first image frame 510 is transparent and that the full resolution of the first image frame 510 is 2000×1000. Further, it is assumed that a majority portion of the first image frame 510 does not include content, and the AR object 530 corresponding to content is present only in a 100×100 region.

In this example, a display apparatus partially renders only the region corresponding to the AR object 530 being content in the first image frame 510 corresponding to a first point in time. Further, the display apparatus does not perform rendering with respect to the transparent region not including content in the first image frame 510.

According to the characteristics of an AR image, a majority portion of the full resolution appears transparent, and content having actual color exists only in a portion of the resolution. Thus, an AR object is sufficiently partially rendered by the second processor that performs a simple operation since the size of an object to be rendered is not great, unlike a VR object. For example, the display apparatus partially renders the AR object 530 corresponding to a partial region in the first image frame 510, and matches the AR object 530 rendered at a desired position or in a desired region, in the entire 2000×1000 image of the second image frame 550. The display apparatus generates the second image frame 550 by disposing the partially rendered AR object 530 in the full-screen image corresponding to the second point in time. In this process, the display apparatus reflects an additional motion of the AR object 530 occurring with respect to a flow of time.

The display apparatus improves the rendering rate by partially rendering an AR object corresponding to content having actual color, and greatly reduces the rendering time and the transmission bandwidth by matching the partially rendered AR object in a second image frame. In this example, the display apparatus partially renders the AR object 530 through supersampling that smooths an image by removing jagged and pixelated edges, that is, aliasing.

Figure 6:
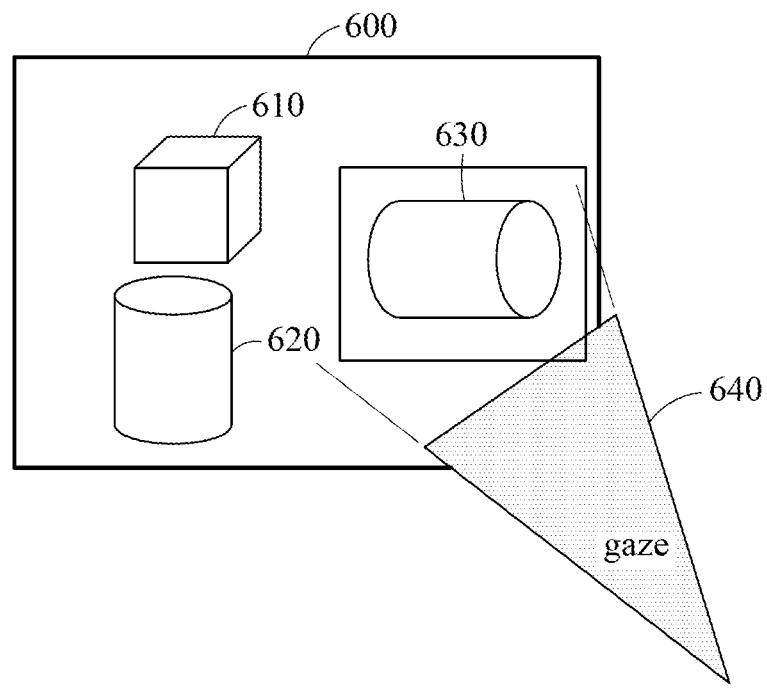
FIG. 6 illustrates an example of correcting an AR object based on gaze information of a user.

FIG. 6 illustrates an example of correcting an AR object based on gaze information of a user. Referring to FIG. 6, an image frame 600 including a focusing area 640 and a defocusing area that are determined based on gaze information or positions of eyes of a user tracked in real time, is illustrated. The defocusing area corresponds to a remaining area excluding the focusing area 640 from the image frame 600.

A display apparatus displays the focusing area 640 of the image frame 600 to be clear at a high resolution through up-sampling and displays the defocusing area other than the focusing area 640 to be blurred at a low resolution through blurring based on the gaze information or the positions of the eyes of the user tracked in real time.

For example, the display apparatus includes a gaze sensor configured to sense a gaze of the user, and the gaze sensor obtains gaze information corresponding to a first point in time and gaze information corresponding to a second point in time. It is assumed that among first AR objects 610, 620, and 630 included in the image frame 600, the first AR object 630 is included in the gaze information corresponding to the second point in time.

The display apparatus corrects the first AR objects 610, 620, and 630 to second AR objects by controlling the resolutions of the first AR objects 610, 620, and 630 based on the gaze information corresponding to the second point in time. The display apparatus corrects the first AR object 630 to a corresponding second AR object by increasing the resolution of the first AR object 630 through up-sampling with respect to the first AR object 630 included in the focusing area 640 determined based on the gaze information corresponding to the second point in time. The display apparatus corrects the first AR objects 610 and 620 to corresponding second AR objects by decreasing the resolutions of the first AR objects 610 and 620 through a blur operation with respect to the first AR objects 610 and 620 included in the defocusing area determined based on the gaze information corresponding to the second point in time.

According to examples, the display apparatus captures the focusing area 640 at a higher resolution than the defocusing area, or displays the focusing area 640 at a higher resolution than the defocusing area.

In another example, the display apparatus includes an IMU sensor and corrects a first AR object to a second AR object based on second motion information sensed by the IMU sensor. The second motion information includes, for example, a motion of a user corresponding to the second point in time, a motion of a target object included in second sensor data, and a motion of the display apparatus corresponding to the second point in time. The display apparatus corrects the first AR object to the second AR object by controlling at least one of a resolution of the first AR object and an operating frequency of a sensor used to sense first sensor data based on the second motion information.

For example, in response to the second motion information of the second point in time being greater than first motion information of the first point in time, the display apparatus corrects the first AR object to the second AR object principally based on the rate, rather than the accuracy or the details of the first AR object. The display apparatus corrects the first AR object to the second AR object by increasing the operating frequency of a display and/or the IMU sensor and decreasing the resolution of the first AR object. Here, "increasing the operating frequency of the display and/or the IMU sensor" may refer to increasing the number of image frames.

Conversely, in response to the second motion information of the second point in time being less than or equal to the first motion information of the first point in time, the display apparatus corrects the first AR object to the second AR object principally based on the accuracy or the details of the first AR object. The display apparatus corrects the first AR object to the second AR object by decreasing the operating frequency of the display and/or the IMU sensor and increasing the resolution of the first AR object. Here, "decreasing the operating frequency of the display and/or the IMU sensor" may refer to decreasing the number of image frames.

According to examples, the display apparatus adjusts a focusing area of a camera based on sensor data obtained by the IMU sensor and/or the gaze sensor.

In still another example, the display apparatus includes a depth sensor, and the depth sensor obtains first sensor data including a first depth value of a first AR object corresponding to the first point in time and second sensor data including a second depth value of a background area corresponding to the second point in time. The display apparatus determines an arrangement of the first AR object and the background area based on the first depth value of the first AR object and the second depth value of the background area. The display apparatus performs occlusion processing with respect to at least a partial area of the first AR object based on the arrangement.

For example, it is assumed that a portion of the first AR object and the background area overlap, and that the first depth value of the first AR object is greater than the second depth value of the background area. Here, the first depth value greater than the second depth value indicates that the first AR object is positioned behind the background area. The display apparatus corrects the first AR object to the second AR object by performing occlusion processing to remove the partial region of the first AR object overlapping the background area based on the arrangement of the first AR object and the background area.

Figure 7A:
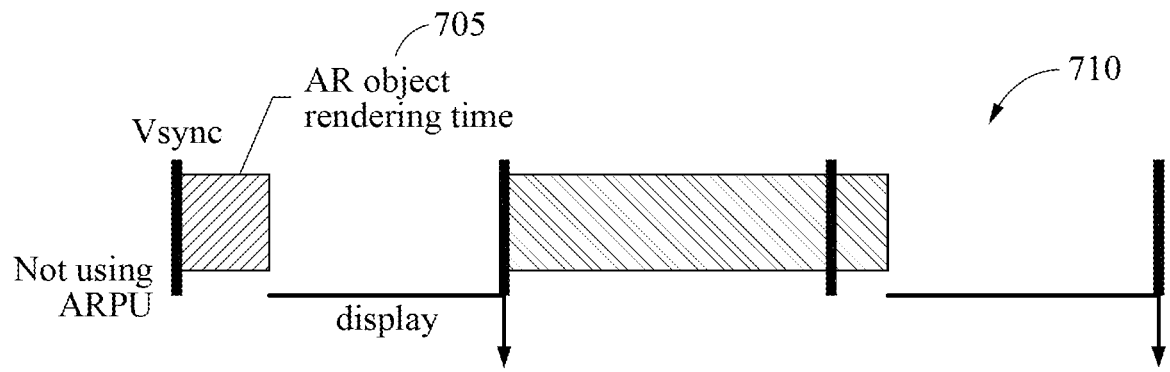
FIGS. 7A and 7B illustrate an example of asynchronously updating a synchronization signal by a second processor.
Figure 7B:
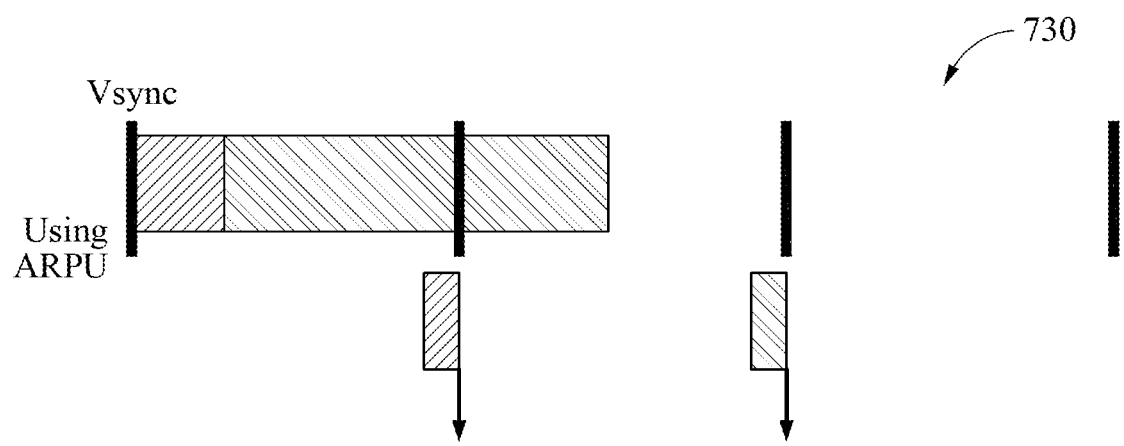

FIGS. 7A and 7B illustrate an example of asynchronously updating a synchronization signal by a second processor. FIG. 7A shows an example 710 of an operation of a first processor, for example, a GPU, with respect to a synchronization signal, for example, Vsync signal, if a second processor, for example, an ARPU, is not used, and FIG. 7B shows an example 730 of an operation of the first processor with respect to the synchronization signal if the second processor, for example, the ARPU, is used. The synchronization signal is, for example, a vertical synchronization (Vsync) signal.

The Vsync signal corresponds to a signal configured to synchronize the timing for the first processor to generate an image frame and the timing for a display to output the frame. For example, it is assumed that the display displays 60 frames per second (the display rate of 60 hertz (Hz)), and the first processor displays 100 frames per second.

In the example 710 in which the second processor, for example, the ARPU, is not used, in response to the display and the first processor being synchronized by the synchronization signal, the first processor is synchronized to the display rate of the display and displays 60 frames per second and thus, should wait for a synchronization signal even after the termination 705 of AR object rendering. In this example, the first processor decreases the full rendering quality to process a full rendering time scene before the synchronization signal, or wastes time in waiting for a subsequent synchronization signal.

In the example 730, by processing the synchronization signal using the second processor, for example, the ARPU, after the termination of AR object rendering, the first processor renders an AR object and displays the rendered AR object through the display, irrespective of whether the first processor and the display are synchronized. The second processor reduces the waste of waiting time of the first processor by updating a synchronization signal for synchronization between the first processor and the display, irrespective of whether the first processor and the display are synchronized.

Figure 8:
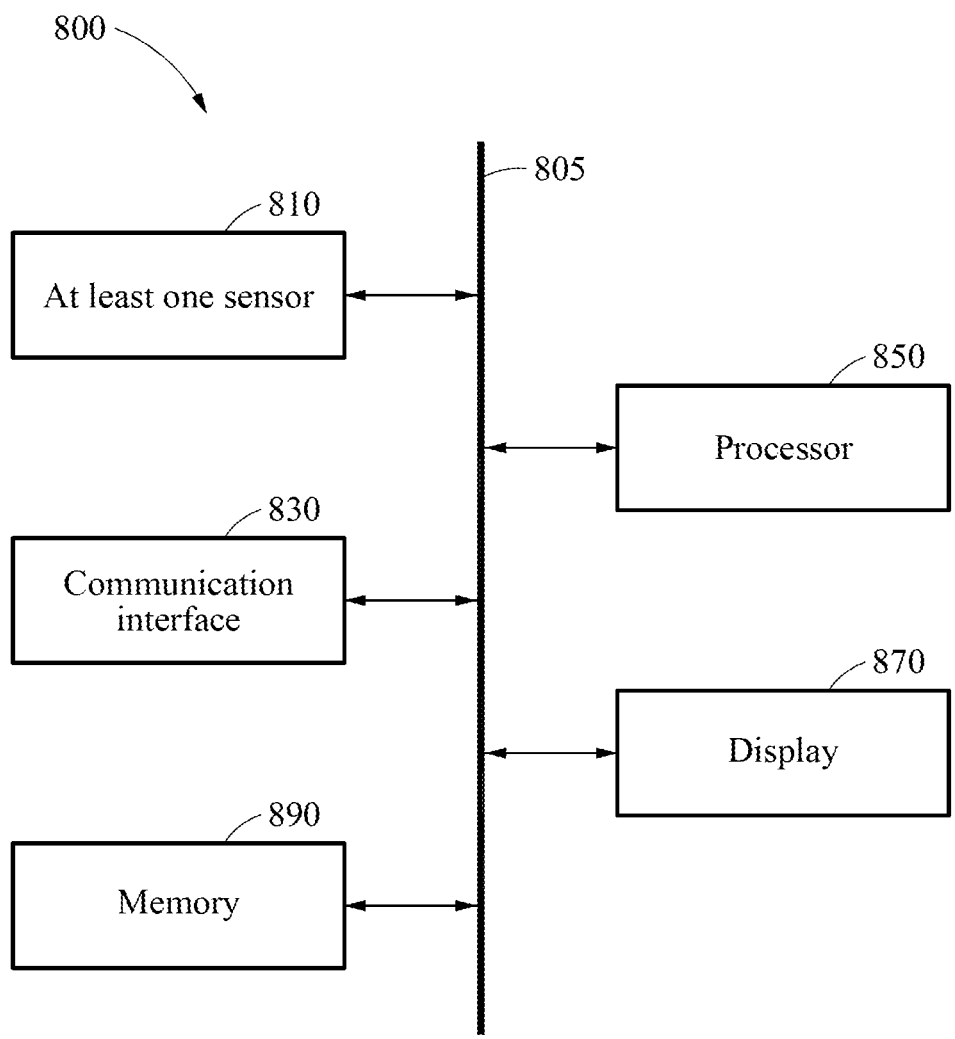
FIG. 8 illustrates an example of an apparatus for displaying an AR object.

FIG. 8 illustrates an example of an apparatus for displaying an AR object. Referring to FIG. 8, an apparatus 800 for displaying an AR object, hereinafter, the "display apparatus" 800, includes at least one sensor 810, a communication interface 830, a processor 850, and the display 870. The display apparatus 800 further includes a memory 890. The at least one sensor 810, the communication interface 830, the processor 850, the display 870, and the memory 890 communicate with each other through a communication bus 805.

The at least one sensor 810 obtains at least one first sensor data of a first point in time and obtains second sensor data of a second point in time following the first point in time. The at least one sensor 810 includes, for example, any one or any combination of an RGB camera sensor, an IMU sensor, a gaze sensor, and eye tracker, and a depth sensor.

The communication interface 830 receives a first image frame including a first AR object corresponding to the first point in time, the first AR object generated by a first processor based on the first sensor data. In this example, the first processor is a processor outside of the display apparatus 800, or a processor, other than the processor 850, included in the display apparatus 800. The first processor is a GPU configured to perform a complex operation such as 3D rendering of AR objects.

The processor 850 corrects the first AR object to a second AR object matched to the second point in time, based on the second sensor data obtained by the at least one sensor 810. The processor 850 is, for example, a programmable 2D image processor or a programmable AR processor. The processor 850 corresponds to the second processor described above.

The display 870 displays a second image frame including the second AR object to which the first AR object is corrected by the processor 850.

The memory 890 stores the first sensor data and the second sensor data. Further, the memory 890 stores the first AR object received through the communication interface 830 and/or the second AR object to which the first AR object is corrected by the processor 850. The memory 890 stores an image frame including the second AR object to be displayed through the display 870.

The display apparatus 800 is, for example, a HUD, a user terminal, an AR device, a wearable device, or smart glasses.

The processor 850 performs at least one of the methods described with reference to FIGS. 1 through 7 or an algorithm corresponding to at least one of the methods. The processor 850 is a data processing device implemented by hardware including a circuit having a physical structure to perform desired operations. For example, the desired operations include instructions or codes included in a program. The hardware-implemented data processing device includes a microprocessor, a central processing unit (CPU), a processor core, a multi-core processor, a multiprocessor, an application-specific integrated circuit (ASIC), and a field-programmable gate array (FPGA).

The processor 850 executes a program and controls the display apparatus 800. Program codes to be executed by the processor 850 are stored in the memory 890.

The memory 890 stores a variety of information generated in the processing process of the processor 850 described above. In addition, the memory 890 stores a variety of data and programs. The memory 890 is a volatile memory or a non-volatile memory. The memory 890 includes a large-capacity storage medium such as a hard disk to store the variety of data.

The display apparatus 100, 300, 800, and other apparatuses, units, modules, devices, and other components described herein with respect to FIGS. 1-8 are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-8 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD–Rs, CD+Rs, CD–RWs, CD+RWs, DVD-ROMs, DVD–Rs, DVD+Rs, DVD–RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An operating method of a display apparatus, the operating method comprising:
    obtaining first sensor data of a first point in time;
    receiving a first image frame including a first augmented reality (AR) object corresponding to the first point in time, the first AR object generated by a first processor based on the first sensor data;
    obtaining second sensor data of a second point in time subsequent to the first point in time;
    correcting the first AR object to a second AR object matched to the second point in time, by controlling an operating frequency of a sensor used to sense the first sensor data based on a result of comparing the first sensor data and the second sensor data; and
    displaying a second image frame including the second AR object.

2. The operating method of claim 1, wherein the correcting comprises correcting the first AR object to the second AR object by performing one or both of two-dimensional (2D) image processing based on at least one of red, green, blue (RGB) information and depth information of the first AR object and three-dimensional (3D) image processing with respect to the first AR object, based on the second sensor data.

3. The operating method of claim 2, wherein the correcting comprises correcting the first AR object to the second AR object by performing an operation for image processing, based on a difference between the first sensor data and the second sensor data.

4. The operating method of claim 3, wherein the operation for image processing is changed based on one or both of a type of at least one sensor used to sense the first sensor data and the second sensor data, and an application field in which the second AR object is used.

5. The operating method of claim 1, wherein the correcting comprises correcting the first AR object to the second AR object by shifting the first AR object through a shift operation, based on a difference between the first sensor data and the second sensor data.

6. The operating method of claim 1, wherein the correcting comprises:
    partially rendering the first AR object corresponding to a partial area in the first image frame; and
    matching the partially rendered first AR object to the second image frame corresponding to the second point in time.

7. The operating method of claim 1, wherein the second sensor data comprises second motion information corresponding to the second point in time, the second motion information obtained by an inertial measurement unit (IMU) sensor, and
    wherein the correcting comprises correcting the first AR object to the second AR object by controlling one or both of the operating frequency of the sensor used to sense the first sensor data and a resolution of the first AR object, based on the second motion information.

8. The operating method of claim 7, wherein the second motion information comprises any one or any combination of a motion of a user corresponding to the second point in time, a motion of a target object included in the second sensor data, and a motion of the display apparatus corresponding to the second point in time.

9. The operating method of claim 7, wherein the correcting comprises one or both of:
correcting the first AR object to the second AR object by increasing the operating frequency of the sensor used to sense the first sensor data and decreasing the resolution of the first AR object, in response to the second motion information being greater than first motion information corresponding to the first point in time; and
correcting the first AR object to the second AR object by decreasing the operating frequency of the sensor used to sense the first sensor data and increasing the resolution of the first AR object, in response to the second motion information being less than or equal to the first motion information.

10. The operating method of claim 1, wherein the second sensor data comprises gaze information corresponding to the second point in time, the gaze information obtained by a gaze sensor used to sense a gaze of a user who uses the display apparatus, and
wherein the correcting comprises controlling a resolution of the first AR object, based on the gaze information corresponding to the second point in time.

11. The operating method of claim 10, wherein the controlling comprises one or both of:
increasing the resolution of the first AR object by performing up-sampling with respect to the first AR object included in a focusing area based on the gaze information corresponding to the second point in time; and
decreasing the resolution of the first AR object by performing a blur operation with respect to the first AR object included in a defocusing area based on the gaze information.

12. The operating method of claim 1, wherein the second sensor data comprises a second depth value of a background area corresponding to the second point in time, the second depth value sensed by a depth sensor, and
wherein the correcting comprises:
determining an arrangement of the first AR object and the background area, based on a first depth value of the first AR object and the second depth value; and
performing occlusion processing with respect to at least a partial area of the first AR object, based on the arrangement.

13. The operating method of claim 1, further comprising:
updating, by a second processor, a synchronization signal for synchronization between the first processor and a display of the display apparatus, irrespective of whether the first processor and the display are synchronized.

14. The operating method of claim 1, wherein the first processor is included in any one or any combination of the display apparatus, an external device different from the display apparatus, and a cloud server, and the first processor is configured to generate the first AR object through 3D rendering.

15. The operating method of claim 1, wherein the display apparatus comprises any one or any combination of a head-up display (HUD), a user terminal, an AR device, a wearable device, and smart glasses including a display.

16. The operating method of claim 1, wherein one or both of the first sensor data and the second sensor data is sensed by any one or any combination of a camera sensor, an inertial measurement unit (IMU) sensor, a gaze sensor, an eye tracker, and a depth sensor included in the display apparatus.

17. A non-transitory computer-readable storage medium storing instructions that, when executed by a second processor, cause the second processor to perform the operating method of claim 1.

18. A display apparatus, comprising:
at least one sensor configured to obtain first sensor data of a first point in time and second sensor data of a second point in time subsequent to the first point in time;
a communication interface configured to receive a first image frame including a first augmented reality (AR) object corresponding to the first point in time, the first AR object generated by a first processor based on the first sensor data;
a second processor configured to correct the first AR object to a second AR object matched to the second point in time, by controlling an operating frequency of the at least one sensor used to sense the first sensor data based on a result of comparing the first sensor data and the second sensor data; and
a display configured to display a second image frame including the second AR object.

19. The display apparatus of claim 18, wherein the second processor is configured to correct the first AR object to the second AR object by performing one or both of two-dimensional (2D) image processing based on one or both of red, green, blue (RGB) information and depth information of the first AR object and three-dimensional (3D) image processing with respect to the first AR object, based on the second sensor data.

20. The display apparatus of claim 18, wherein the second processor is configured to correct the first AR object to the second AR object by performing an operation for the image processing, based on a difference between the first sensor data and the second sensor data.

21. A display apparatus, comprising:
a sensor configured to sense first sensor data of a first point in time and second sensor data of a second point in time subsequent to the first point in time;
an interface configured to receive a first augmented reality (AR) object that is generated based on the first sensor data and corresponds to the first point in time;
a processor configured to perform image processing on the first AR object based on the second sensor data to generate a second AR object matched to the second point in time,
wherein the generating of the second AR object matched to the second point in time includes correcting the first AR object to the second AR object by controlling an operating frequency of the sensor used to sense the first sensor data based on a result of comparing the first sensor data and the second sensor data; and
a display configured to display the second AR object.

22. The display apparatus of claim 21, wherein the first AR object is included in a first image frame that is transmitted to the display apparatus with a latency.

23. The display apparatus of claim 21, wherein the first AR object is generated by a second processor.

24. The display apparatus of claim 23, wherein the second processor is included in the display apparatus.

25. The display apparatus of claim 23, wherein the second processor is independent from the display apparatus.

* * * * *